(12) United States Patent
Westerdahl et al.

(10) Patent No.: US 7,118,640 B2
(45) Date of Patent: Oct. 10, 2006

(54) METHOD FOR REINFORCING A DOUBLE-SHELL STRUCTURE

(75) Inventors: Anders Westerdahl, Linköping (SE); Max Krogager, Linköping (SE); Nils-Gunnar Jaktlund, Linköping (SE); Lars Löfgren, Linköping (SE)

(73) Assignee: Saab AB, Linköping (SE)

( * ) Notice: Subject to any disclaimer, the term of this patent is extended or adjusted under 35 U.S.C. 154(b) by 127 days.

(21) Appl. No.: 10/498,487

(22) PCT Filed: Dec. 9, 2002

(86) PCT No.: PCT/SE02/02273

§ 371 (c)(1),
(2), (4) Date: Jun. 14, 2004

(87) PCT Pub. No.: WO03/053693

PCT Pub. Date: Jul. 3, 2003

(65) Prior Publication Data

US 2005/0109447 A1    May 26, 2005

(30) Foreign Application Priority Data

Dec. 13, 2001 (SE) .................................. 0104196

(51) Int. Cl.
*B29C 73/02* (2006.01)

(52) U.S. Cl. .................... 156/94; 29/402.01; 29/402.09

(58) Field of Classification Search .................. 156/94; 29/402.01, 402.09
See application file for complete search history.

(56) References Cited

U.S. PATENT DOCUMENTS 3,019,865 A * 2/1962 Rohe ........................ 52/787.12
4,978,404 A   12/1990 Westerman, Jr.
5,190,611 A   3/1993 Cologna et al.
5,207,541 A   5/1993 Westerman et al.

* cited by examiner

*Primary Examiner*—Jessica Rossi
(74) *Attorney, Agent, or Firm*—Bingham McCutchen LLP

(57) ABSTRACT

The invention concerns a method for reinforcing a double-shell structure in which a cellular core (2) is arranged between a first shell (5) and a second shell (6). In the method according to the invention, at least one cavity is formed in the double-shell structure from an opening in the first shell into the cellular core (2) so that the cavity substantially extends through the cellular core (2) to the second shell. Fixative (8) is injected into the cavity. A stiff bar (7) is introduced into the cavity, whereupon excess fixative (8) is allowed to pass out of the cavity. Finally, the fixative left in the cavity is cured.

5 Claims, 1 Drawing Sheet

METHOD FOR REINFORCING A DOUBLE-SHELL STRUCTURE

TECHNICAL AREA

The invention concerns a method for reinforcing a double-shell structure in which a cellular core is arranged between a first and a second shell.

STATE OF THE ART

A double-shell structure with composite or sheet metal shells often contains a spacer material of the cellular core type. For fabrication reasons, a cellular core is often made up of a plurality of units of the cellular core type, which are glued together to form the cellular core. The joints can become overloaded during fabrication or operational use, so that the units are at risk of separating from one another at one or a plurality of segments along the joints. This degrades the strength of the cellular core substantially.

U.S. Pat. No. 5,190,611 discloses a method for repair of composite structures. The method is used when there is an undesired opening in a panel of composite material. Material is removed from the panel in the region surrounding the opening and the prepared opening may extend all the way through the panel. An insert is positioned in the prepared opening and bonded to the surface. This method is suitable for repair of composite structures comprising layers of reinforcing fibers within a resin matrix. However, the method disclosed is not applicable for reinforcing or repairing so called double-shell structure and the particular problems that arise from cracks between the units in the cellular core.

In order to reinforce or repair a cellular core inside an article having a double-shell structure, holes must be made in one of the shells. The holes made for the purpose of such repairs must subsequently be repaired. If the holes lead to a weakening of the shell, the shell must be reinforced so that it can bear its loads. Such repairs are usually extremely expensive, and it is also difficult to achieve sufficient strength in both the cellular core and the shell in which the holes have been made.

No effective methods currently exist for repairing glue joints. The methods that are used at present are based on cutting out a portion of the cellular core material at the glue joint, after which a repair section is inserted and fixed by glue. Because it is difficult to harden the repaired area to the same strength as the undamaged cellular core, such repairs lead to structural degradation.

DESCRIPTION OF THE INVENTION

The object of the invention is to provide a method for reinforcing a double-shell structure having an intermediate cellular core. The cellular core may be a honeycomb structure, a foam structure or any other type of cellular structure suitable as spacer material. The reinforcement is achieved by means of a method in which a cavity is formed in the double-shell structure from an opening in the first shell into the cellular core so that the cavity substantially extends through the cellular core to the second shell.

Fixative is injected into the cavity, after which a stiff bar whose shape conforms to the cavity is introduced into same, whereupon the excess fixative is allowed to pass out of the cavity and is removed. The fixative left in the cavity hardens.

The invention pertains in particular to a method for reinforcing a cellular core that comprises a first and a second unit of the cellular core type arranged next to one another and joined by means of a glue joint, whereupon the cavity can extend through the first unit and into the second unit.

In another embodiment of the invention, the cavity is realized at an angle falling within the range of 30–60° relative to the horizontal plane. The cavity preferably consists of a longitudinally extended drill hole with a cylindrical cross-section.

According to yet another embodiment of the invention, said element consists of a bar with a non-cylindrical cross-section, whereupon at least one passage for the fixative is realized after the bar is introduced into the cavity.

The described method can be used to reinforce glue joints between a first and a second unit in a cellular core. The method can also be used to repair broken joints, e.g. in double-shell articles. The method according to the invention is also suited for repairing locally damaged portions of a cellular core, or to reinforce/stiffen cores in double-shell structures. The method is used for repairs both in the workshop and in the field, i.e. proximate to the area in which the damaged article is normally used.

One advantage that the repair method according to the invention has over the repair methods currently in use is that the making of cavities in the shells can be limited. The weakening of the shell is thus very minor. This means that the repair of the cavity in the shell is simple, and that reinforcement may not need to be carried out, but rather it suffices to seal the cavities to prevent moisture from penetrating into the core. The method is also fast, in that repairs are accomplished via a single hardening step. The method can also provide increased stiffness/strength in comparison with the original, undamaged material.

DESCRIPTION OF PREFERRED EMBODIMENTS

Figure 1:
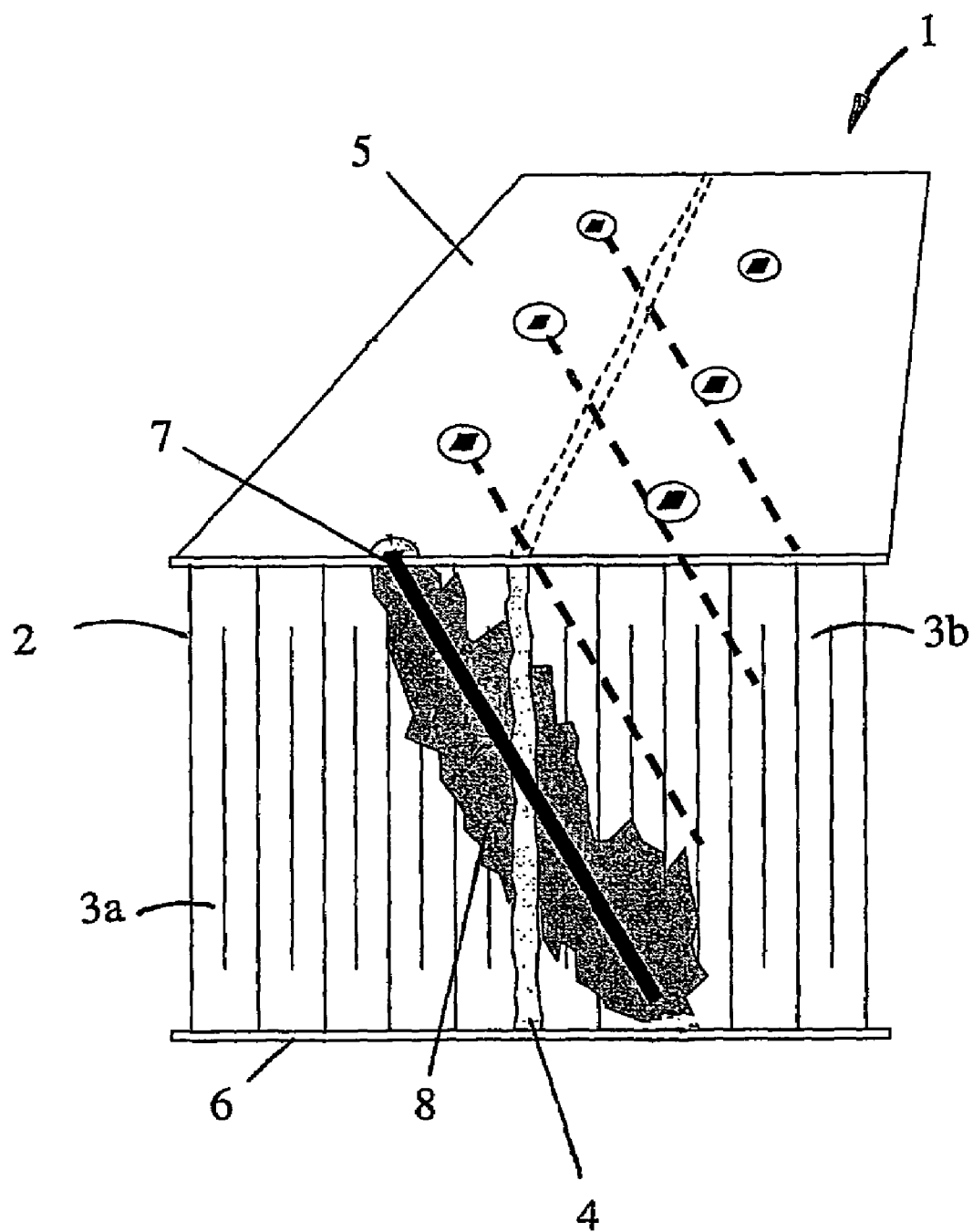
FIG. 1 shows a side view of a double-shell structure repaired using the method according to the invention.

FIG. 1 shows a side view of a double-shell structure 1 repaired using the method according to the invention. The double-shell structure includes a first shell 5 and a second shell 6 on each side of a cellular core 2. The first and second shells 5,6 are preferably composite material or sheet metal. The cellular core consists of any material suitable in a honeycomb structure, foam structure or other type of cellular structure. The figure shows a bar 7 made of material suitable for the purpose, such as carbon fiber, which has been fixed in a cavity that extends through the cellular core 2 which, in the figure, comprises a first unit of the cellular core type 3a and a second unit of the cellular core type 3b. The bar has been fixed in place by means of a fixative 8.

The opening to the cavity is realized in one of the surfaces 5, 6 of the double-shell structure. In the embodiment shown in the figure, the cavity is realized through a first shell surface 5 in a first unit of the cellular core type 3a and continuing on into a second unit of the cellular core type 3b; both the units 3a, 3b can be made of the same material or different materials, e.g. materials of different densities. The cavity extends through the glue joint 4. Because the cavity is realized on the inside of the double-shell structure, the repair is not visible on the outside of the double-shell structure. The cavity in the embodiment shown has not been realized in through-passing fashion. One advantage of this embodiment is that repairs to the shell layer need be carried out on only one of the shell surfaces 5, 6. It is of course also possible to realize the cavity in through-passing fashion and, after the bar 7 has been fixed in place, to repair and seal both the first and second shell 5,6. The cavity can consist of a drill hole through the first shell 5 and the cellular core 2. Other types of mechanical machining to create the cavity are of course also possible, as are other machining methods by means of which a cavity of the specified shape can be formed. When drilling is used, a cavity with a cylindrical cross-section is obtained.

A bar 7 of, e.g. carbon fiber is given a longitudinal shape that can exceed the depth of the drill hole. The bar 7 can also be fabricated at a length matched to that of the drill hole, so that the bar 7 need not be shortened after fixation. It is often advantageous to make the bars from the same material as the surrounding shell structures, although other material choices are of course also possible.

The bar 7 is preferably given a non-cylindrical cross-section, e.g. an angular cross-section with dimensions such that the bar can be introduced into the cylindrical drill hole. Because the cross-section of the bar differs from that of the drill hole, four channel-like penetrations will be present between the bar and the drill hole when the bar is introduced into the drill hole. Other cross-sections are of course also possible in connection with the design of the bar. However, it is important that the cross-section be chosen so that a penetration from the bottom of the drill hole to its opening is obtained even when the rod 7 is introduced into the drill hole.

Paste glue or other fixative 8 is injected into the cavity, filling it entirely. The bar is then pushed down into the cavity. The angularity of the bar enables excess glue to be forced up to the surface along the bar. The four channel-like penetrations are filled with glue, and the glue is disposed around the bar in this way. This is favorable from a strength standpoint. The excess glue is removed. The same effect can be achieved by realizing a through-passing channel in the bar.

When the glue 8 has hardened, the bar is cross-cut and ground flush with the shell. The bar can also be prefabricated at a length that enables the entire bar to reside beneath the shell surface. The first shell 5 is subsequently sealed and optionally reinforced to the required level.

The method will now be described in connection with the repair of a hatch on an airplane. The hatch is examined radiographically, and the lengths and positions of any cracks are noted. Appropriate locations for the cavities are marked out on a first surface. To avoid additional damage to the cellular core, a short grinding pin with a diamond surface is used to penetrate through the first shell. Cavities are then drilled through the core and the damaged porous material. A drilling jig is suitable for this purpose. The cavities are vacuumed clean, after which the surfaces around the cavities are protected with masking tape.

A carbon fiber bar with dimensions matching the cavity is prepared. The bar can have an angular cross-section, so that one or a plurality of channels is formed between the bar and the inner surface of the cavity when the bar is introduced into the cavity. The bar is coated with Hysol EA9394 or some other suitable fixative. The same fixative is injected into the cavity. It is important that fixative be applied all the way down to the bottom of the cavity. Following completed injection of the fixative, the bar is introduced. The introduction of the bar must occur at different speeds, depending on the type of fixative chosen. When Hysol EA9394 is used, it is important that the bar be introduced immediately after injection is completed. The injection of a binding agent creates pressure in the cellular core, which tends to force the Hysol back out of the cellular core. The carbon rod is inserted immediately after injection is completed in order to prevent the Hysol from being forced back out.

After the bar is in place, the structure is allowed to harden at room temperature for a period of time that depends on the fixative chosen. The method can be repeated for a plurality of drill holes. Once hardening has been completed, the masking tape can be removed and any excess fixative ground off. The first shell is sealed by coating it with some type of composite plastic, which can harden under pressure at room temperature or some higher temperature. The surface is subsequently smoothed.

The method can be used to stiffen or reinforce a cellular core. One example is the need for a new fastening point on an existing sandwich structure. The new fastening point may require a stiffer or stronger core than was originally chosen. Using the proposed method, the core can be reinforced beneath the fastening point with minimal intervention.

The method can also be used to reinforce existing joints in a cellular core 2. The method can further be used to repair broken joints, e.g. in connection with the fabrication of double-shell articles or the repair of locally damaged components in a cellular core.

The invention claimed is:

1. A method for reinforcing a double-shell structure in which a cellular core is arranged between a first shell and a second shell, the method comprising the steps of:
    forming at least one cavity in the double-shell structure from an opening in the first shell into the cellular core so that the cavity substantially extends through the cellular core to the second shell, wherein the cellular core comprises a first and a second unit of the cellular core type that are arranged next to one another and joined by means of a glue joint, whereupon the cavity is arranged to extend through the first unit and into the second unit;
    injecting a fixative in the cavity;
    introducing an element into the cavity, whereupon excess fixative is forced to pass out through the opening and be removed; and
    curing the fixative left in the cavity.

2. A method according to claim 1, wherein the cavity is disposed at an angle falling within the range of 30–60° C. relative to the horizontal plane.

3. A method according to claim 1, wherein said element is a bar with a non-cylindrical cross-section, whereby at least one passage for fixative is formed upon the introduction of the bar into the cavity.

4. A method according to claim 3, wherein the bar is relatively rigid.

5. A method according to claim 4, wherein the relatively rigid bar is a rod.

* * * * *